(12) United States Patent
Morgan

(10) Patent No.: US 9,602,592 B2
(45) Date of Patent: *Mar. 21, 2017

(54) TRIGGERING WORKLOAD MOVEMENT BASED ON POLICY STACK HAVING MULTIPLE SELECTABLE INPUTS

(71) Applicant: Red Hat, Inc., Raleigh, NC (US)

(72) Inventor: Christopher Edwin Morgan, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/715,312

(22) Filed: May 18, 2015

(65) Prior Publication Data

US 2015/0249707 A1 Sep. 3, 2015

Related U.S. Application Data

(63) Continuation of application No. 13/149,418, filed on May 31, 2011, now Pat. No. 9,037,723.

(51) Int. Cl.
| | | |
|---|---|---|
| *G06F 15/173* | (2006.01) | |
| *H04L 29/08* | (2006.01) | |
| *G06F 9/48* | (2006.01) | |
| *H04L 12/64* | (2006.01) | |
| *G06F 9/50* | (2006.01) | |

(52) U.S. Cl.
CPC ........ *H04L 67/1002* (2013.01); *G06F 9/4856* (2013.01); *G06F 9/5072* (2013.01); *H04L 12/6418* (2013.01)

(58) Field of Classification Search
CPC ............... G06F 9/5072; H04L 12/6418; H04L 67/1002; H04L 9/4856
See application file for complete search history.

(56) References Cited

U.S. PATENT DOCUMENTS

| | | |
|---|---|---|
| 6,463,457 B1 | 10/2002 | Armentrout et al. |
| 7,313,796 B2 | 12/2007 | Hamilton et al. |
| 7,439,937 B2 | 10/2008 | Ben-Shachar et al. |
| 7,529,785 B1 | 5/2009 | Spertus et al. |
| 7,546,462 B2 | 6/2009 | Upton |
| 7,596,620 B1 | 9/2009 | Colton et al. |

(Continued)

OTHER PUBLICATIONS

Microsoft, Developer Network, SQL Server 2014 "Administer Servers by Using Policy-Based Management" retrieved from https://msdn.microsoft.com/en-us/library/bb510667.aspx on May 18, 2015.

(Continued)

*Primary Examiner* — Mohamed Wasel
(74) *Attorney, Agent, or Firm* — Lowenstein Sandler LLP

(57) ABSTRACT

A policy management tool can access a set of usage history data for a set of resources consumed by the workload and generate a migration policy stack in view of a set of user-selected policy parameters, wherein the set of user-selected policy parameters comprises a set of multiple selectable inputs, and the migration policy stack comprises a set of one or more migration policies. The policy management tool can evaluate the set of one or more workload migration policies in view of the set of usage history data to configure a migration of the workload, and schedule the migration of the workload in view of the evaluating.

20 Claims, 8 Drawing Sheets

(56) References Cited

U.S. PATENT DOCUMENTS

| | | |
|---|---|---|
| 2001/0039497 A1 | 11/2001 | Hubbard |
| 2002/0069276 A1 | 6/2002 | Hino et al. |
| 2002/0165819 A1 | 11/2002 | McKnight et al. |
| 2003/0037258 A1 | 2/2003 | Koren |
| 2003/0110252 A1 | 6/2003 | Yang-Huffman |
| 2003/0135609 A1 | 7/2003 | Carlson et al. |
| 2004/0162902 A1 | 8/2004 | Davis |
| 2004/0210591 A1 | 10/2004 | Hirschfeld et al. |
| 2004/0210627 A1 | 10/2004 | Kroening |
| 2004/0268347 A1 | 12/2004 | Knauerhase et al. |
| 2005/0131898 A1 | 6/2005 | Fatula |
| 2005/0144060 A1 | 6/2005 | Chen et al. |
| 2005/0182727 A1 | 8/2005 | Robert et al. |
| 2005/0289540 A1 | 12/2005 | Nguyen et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0046960 A1* | 2/2008 | Bade .................. G06F 9/4856 726/1 |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhardt et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris et al. |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0217850 A1 | 8/2010 | Ferris |
| 2010/0217864 A1 | 8/2010 | Ferris |
| 2010/0217865 A1 | 8/2010 | Ferris |
| 2010/0220622 A1 | 9/2010 | Wei |
| 2010/0299366 A1 | 11/2010 | Stienhans et al. |
| 2010/0306354 A1 | 12/2010 | DeHaan et al. |
| 2010/0306377 A1 | 12/2010 | DeHaan et al. |
| 2010/0306379 A1 | 12/2010 | Ferris |
| 2010/0306566 A1 | 12/2010 | DeHaan et al. |
| 2010/0306765 A1 | 12/2010 | DeHaan |
| 2010/0306767 A1 | 12/2010 | DeHaan |
| 2011/0016214 A1 | 1/2011 | Jackson |
| 2011/0055034 A1 | 3/2011 | Ferris et al. |
| 2011/0055377 A1 | 3/2011 | DeHaan |
| 2011/0055378 A1 | 3/2011 | Ferris et al. |
| 2011/0055396 A1 | 3/2011 | DeHaan |
| 2011/0055398 A1 | 3/2011 | DeHaan et al. |
| 2011/0055588 A1 | 3/2011 | DeHaan |
| 2011/0107103 A1 | 5/2011 | Dehaan et al. |
| 2011/0131134 A1 | 6/2011 | Ferris et al. |
| 2011/0131306 A1 | 6/2011 | Ferris et al. |
| 2011/0131315 A1 | 6/2011 | Ferris et al. |
| 2011/0131316 A1 | 6/2011 | Ferris et al. |
| 2011/0131335 A1 | 6/2011 | Spaltro et al. |
| 2011/0131499 A1 | 6/2011 | Ferris et al. |
| 2011/0213686 A1 | 9/2011 | Ferris et al. |
| 2011/0213687 A1 | 9/2011 | Ferris et al. |
| 2011/0213691 A1 | 9/2011 | Ferris et al. |
| 2011/0213713 A1 | 9/2011 | Ferris et al. |
| 2011/0213719 A1 | 9/2011 | Ferris et al. |
| 2011/0213875 A1 | 9/2011 | Ferris et al. |
| 2011/0213884 A1 | 9/2011 | Ferris et al. |
| 2011/0214124 A1 | 9/2011 | Ferris et al. |
| 2011/0295727 A1 | 12/2011 | Ferris et al. |
| 2011/0295986 A1 | 12/2011 | Ferris et al. |
| 2011/0295998 A1 | 12/2011 | Ferris et al. |
| 2011/0295999 A1 | 12/2011 | Ferris et al. |
| 2011/0296000 A1 | 12/2011 | Ferris et al. |
| 2011/0296019 A1 | 12/2011 | Ferris et al. |
| 2011/0296022 A1 | 12/2011 | Ferris et al. |
| 2011/0296023 A1 | 12/2011 | Ferris et al. |
| 2011/0296370 A1 | 12/2011 | Ferris et al. |
| 2012/0130873 A1 | 5/2012 | Morgan |
| 2012/0131161 A1 | 5/2012 | Ferris et al. |
| 2012/0131173 A1 | 5/2012 | Ferris et al. |
| 2012/0131174 A1 | 5/2012 | Ferris et al. |
| 2012/0131176 A1 | 5/2012 | Ferris et al. |
| 2012/0131193 A1 | 5/2012 | Ferris et al. |
| 2012/0131194 A1 | 5/2012 | Morgan |
| 2012/0131195 A1 | 5/2012 | Morgan |
| 2012/0131594 A1 | 5/2012 | Morgan |
| 2012/0136989 A1 | 5/2012 | Ferris et al. |
| 2012/0137001 A1 | 5/2012 | Ferris et al. |
| 2012/0137002 A1 | 5/2012 | Ferris et al. |
| 2012/0137003 A1 | 5/2012 | Ferris et al. |
| 2012/0221454 A1 | 8/2012 | Morgan |
| 2012/0226796 A1 | 9/2012 | Morgan |
| 2012/0226808 A1 | 9/2012 | Morgan |
| 2012/0304170 A1 | 11/2012 | Morgan |
| 2012/0304191 A1 | 11/2012 | Morgan |
| 2012/0311106 A1 | 12/2012 | Morgan |
| 2012/0311153 A1 | 12/2012 | Morgan |
| 2012/0311571 A1 | 12/2012 | Morgan |
| 2013/0050246 A1* | 2/2013 | Barry .................. G06F 11/32 345/593 |

OTHER PUBLICATIONS

Microsoft, TechNet "SQL Server Video Archive" retrieved from https://technet.microsoft.com/en-us/dn912438 on May 18, 2015.

(56) References Cited

OTHER PUBLICATIONS

Cook, Joe, VMware vSphere Blog "vSphere Storage Policy Based Management Overview (part 1)" Sep. 29, 2014, retrieved from http://blogs.vmware.com/vsphere/2014/09/storage-policy-based-management-overview.html on May 18, 2015.
Cook, Joe, VMware vSphere Blog "vSphere Storage Policy Based Management Overview (part 2)" Oct. 9, 2014, retrieved from http://blogs.vmware.com/vsphere/2014/10/vsphere-storage-policy-based-management-overview-part-2.html on May 18, 2015.
Microsoft TechNet Webcast: Virtualization with Centralized, Policy-Based Management (Level 300) retrieved from https://msevents.microsoft.com/CUI/EventDetail.aspx?culture=en-US&EventID=1032399057&CountryCode=US on May 18, 2015.
"rBuilder and the rPath Appliance Platform", 2007 rPath, Inc., wwvv.rpath.com, 3 pgs.
White Paper—"rPath Versus Other Software Appliance Approaches", Mar. 2008, rPath, Inc., www.rpath.com, 9 pgs.
White Paper—"Best Practices for Building Virtual Appliances", 2008 rPath, Inc., www.rpath.com, 6 pgs.

\* cited by examiner

TRIGGERING WORKLOAD MOVEMENT BASED ON POLICY STACK HAVING MULTIPLE SELECTABLE INPUTS

RELATED APPLICATIONS

This application is a continuation of U.S. patent application Ser. No. 13/149,418 filed May 31, 2011, the entire contents of which are hereby incorporated by reference herein.

FIELD

The invention relates generally to systems and methods for triggering workload movement based on a policy stack having multiple selectable inputs, and more particularly, to platforms and techniques for building and applying a migration policy stack that can be used to govern migration policies for workloads operating in a cloud, where the policy stack can be based on or a function of multiple selectable inputs, can be dynamically varying at different times and/or different conditions, and which can be updated at any time with further user selections or other policy changes.

BACKGROUND

The advent of cloud-based computing architectures has opened new possibilities for the rapid and scalable deployment of virtual Web stores, media outlets, social networking sites, and many other on-line sites or services. In general, a cloud-based architecture deploys a set of hosted resources such as processors, operating systems, software and other components that can be combined together to form virtual machines. A user or customer can request the instantiation of a virtual machine or set of machines from those resources from a central server or cloud management system to perform intended tasks, services, or applications. For example, a user may wish to set up and instantiate a virtual server from the cloud to create a storefront to market products or services on a temporary basis, for instance, to sell tickets to or merchandise for an upcoming sports or musical performance. The user can subscribe to the set of resources needed to build and run the set of instantiated virtual machines on a comparatively short-term basis, such as hours or days, for their intended application.

Typically, when a user utilizes a cloud, the user must track the software applications executed in the cloud and/or processes instantiated in the cloud. For example, the user must track the cloud processes to ensure that the correct cloud processes have been instantiated, that the cloud processes are functioning properly and/or efficiently, that the cloud is providing sufficient resources to the cloud processes, and so forth. Due in part to the user's requirements and overall usage of the cloud, the user may have many applications and/or processes instantiated in a cloud at any given instant, and the user's deployment of virtual machines, software, and other resources can change dynamically over time. In cases, the user may also utilize multiple independent host clouds to support the user's cloud deployment. That user may further instantiate and use multiple applications or other software or services inside or across multiple of those cloud boundaries, and those resources may be used or consumed by multiple or differing end-user groups in those different cloud networks.

In terms of the management of a set of virtual machines operated by a user in a cloud, at times the user's consumption of resources in the cloud can vary and/or spike, at different times and/or under different conditions. Since in one regard consumption spikes may entail enhanced or increased subscription costs to the user, that user may wish to attempt to manage their executing workload by way of potential migration to lower-cost or otherwise alternative host clouds or providers. Existing cloud management platforms do not provide the cloud user or operator with tools to configure or manage a set of policies to trigger those types of migrations, based on dynamically changing parameters or conditions which can be set to comprise different types, depths, dependencies, and/or other combinations of workload parameters at different times or under different resource consumption conditions, such as functionally tying resource consumption limits or thresholds to dynamic workload conditions such as varying transaction rates or messaging throughput, for example.

It may be desirable to provide systems and methods for triggering workload movement based on a policy stack having multiple selectable inputs, in which a user can set up, configure, and administer a migration policy stack which can combine multiple or different selectable triggers, conditions, and/or functions to initiate workload migrations based on criteria which can dynamically change at different times or otherwise adapt to different operating conditions of the user's workload or workloads.

DESCRIPTION

Figure 1:
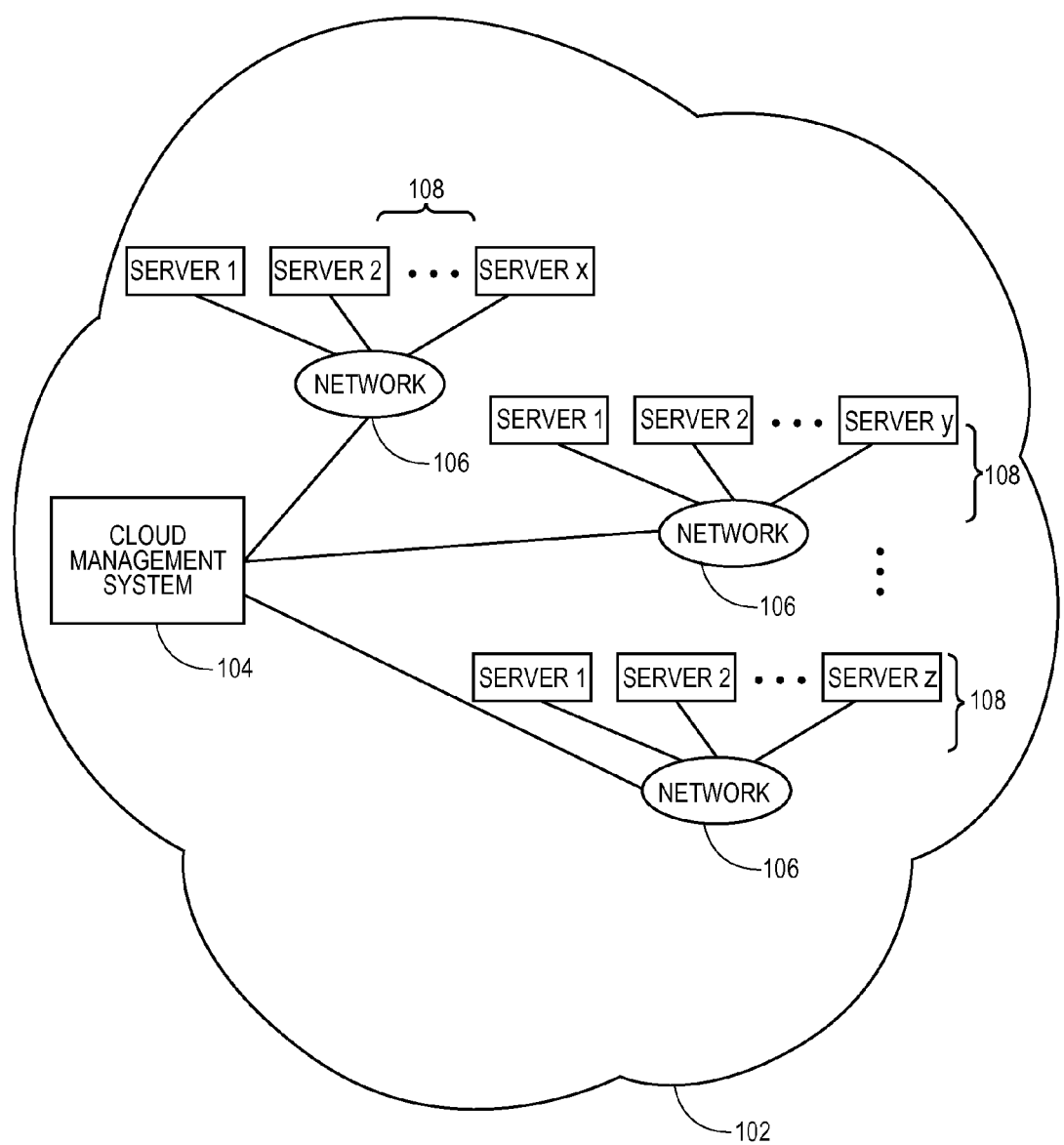
FIG. 1 illustrates an overall cloud system architecture in which various aspects of systems and methods for triggering workload movement based on a policy stack having multiple selectable inputs can be implemented, according to embodiments.

Embodiments described herein can be implemented in or supported by a cloud network architecture. As used herein, a "cloud" can comprise a collection of hardware, software, services, and/or resources that can be invoked to instantiate a virtual machine, process, or other resource for a limited or defined duration. As shown for example in FIG. 1, the collection of resources supporting a cloud 102 can at a hardware level comprise a set of resource servers 108 configured to deliver computing components needed to instantiate a virtual machine, process, service, or other resource. For example, one group of resource servers in set of resource servers 108 can host and serve an operating system, and/or components, utilities, or interfaces related to that operating system, to deliver to a virtual target, and instantiate that machine with an image of that operating system. Another group of servers in set of resource servers 108 can accept requests to host computing cycles or processor time, memory allocations, communications ports or links, and/or other resources to supply a defined level of processing power or throughput for a virtual machine. A further group of resource servers in set of resource servers 108 can host and serve applications or other software to load on an instantiation of a virtual machine, such as an email client, a browser application, a messaging application, or other applications, software, or services. Other types of resource servers can be used to support one or more clouds 102.

In embodiments, the entire set of resource servers 108 and/or other hardware or software resources used to support one or more clouds 102, along with the set of instantiated virtual machines, can be managed by a cloud management system 104. The cloud management system 104 can comprise a dedicated or centralized server and/or other software, hardware, services, and network tools that communicate via network 106, such as the Internet or other public or private network, with all servers in set of resource servers 108 to manage the cloud 102 and its operation. To instantiate a new or updated set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The virtual machines can be instantiated as virtual client machines, virtual appliance machines consisting of special-purpose or dedicated-task machines as understood in the art, and/or as other virtual machines or entities. The request to invoke and instantiate the desired complement of virtual machines can be received and processed by the cloud management system 104, which identifies the type of virtual machine, process, or other resource being requested in that platform's associated cloud. The cloud management system 104 can then identify the collection of hardware, software, service, and/or other resources necessary to instantiate that complement of virtual machines or other resources. In embodiments, the set of instantiated virtual machines or other resources can, for example, and as noted, comprise virtual transaction servers used to support Web storefronts, Web pages, and/or other transaction sites.

In embodiments, the user's instantiation request can specify a variety of parameters defining the operation of the set of virtual machines to be invoked. The instantiation request, for example, can specify a defined period of time for which the instantiated collection of machines, services, or processes is needed. The period of time can be, for example, an hour, a day, a month, or other interval of time. In embodiments, the user's instantiation request can specify the instantiation of a set of virtual machines or processes on a task basis, rather than for a predetermined amount or interval of time. For instance, a user could request a set of virtual provisioning servers and other resources until a target software update is completed on a population of corporate or other machines. The user's instantiation request can in further regards specify other parameters that define the configuration and operation of the set of virtual machines or other instantiated resources. For example, the request can specify a specific minimum or maximum amount of processing power or input/output (I/O) throughput that the user wishes to be available to each instance of the virtual machine or other resource. In embodiments, the requesting user can for instance specify a service level agreement (SLA) acceptable for their desired set of applications or services. Other parameters and settings can be used to instantiate and operate a set of virtual machines, software, and other resources in the host clouds. One skilled in the art will realize that the user's request can likewise include combinations of the foregoing exemplary parameters, and others. It may be noted that "user" herein can include a network-level user or subscriber to cloud-based networks, such as a corporation, government entity, educational institution, and/or other entity, including individual users and groups of users.

When the request to instantiate a set of virtual machines or other resources has been received and the necessary resources to build those machines or resources have been identified, the cloud management system 104 can communicate with one or more set of resource servers 108 to locate resources to supply the required components. Generally, the cloud management system 104 can select servers from the diverse set of resource servers 108 to assemble the various components needed to build the requested set of virtual machines, services, or other resources. It may be noted that in some embodiments, permanent storage, such as optical storage or hard disk arrays, may or may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in one or more clouds 102 can be accessed and leveraged as needed. For example, other software or services that are provided outside of one or more clouds 102 acting as hosts, and are instead hosted by third parties outside the boundaries of those clouds, can be invoked by in-cloud virtual machines or users. For further example, other non-cloud hardware and/or storage services can be utilized as an extension to the one or more clouds 102 acting as hosts or native clouds, for instance, on an on-demand, subscribed, or event-triggered basis.

With the resource requirements identified for building a network of virtual machines, the cloud management system 104 can extract and build the set of virtual machines or other resources on a dynamic, on-demand basis. For example, one set of resource servers 108 may respond to an instantiation request for a given quantity of processor cycles with an offer to deliver that computational power immediately and guaranteed for the next hour or day. A further set of resource servers 108 can offer to immediately supply communication bandwidth, for example on a guaranteed minimum or best-efforts basis, for instance over a defined window of time. In other embodiments, the set of virtual machines or other resources can be built on a batch basis, or at a particular future time. For example, a set of resource servers 108 may respond to a request for instantiation of virtual machines at a programmed time with an offer to deliver the specified quantity of processor cycles within a specific amount of time, such as the next 12 hours. Other timing and resource configurations are possible.

After interrogating and receiving resource commitments from the set of resource servers 108, the cloud management system 104 can select a group of servers in the set of resource servers 108 that match or best match the instantiation request for each component needed to build the user's requested virtual machine, service, or other resource. The cloud management system 104 for the one or more clouds 102 acting as the destination for the virtual machines can then coordinate the integration of the identified group of servers from the set of resource servers 108, to build and launch the requested set of virtual machines or other resources. The cloud management system 104 can track the identified group of servers selected from the set of resource servers 108, or other distributed resources that are dynamically or temporarily combined, to produce and manage the requested virtual machine population, services, or other cloud-based resources.

In embodiments, the cloud management system 104 can generate a resource aggregation table or other record that identifies the various selected sets of resource servers in set of resource servers 108 that will be used to supply the components of the set of instantiated virtual machines, services, or processes. The selected sets of resource servers can be identified by unique identifiers such as, for instance, Internet protocol (IP) addresses or other addresses. In aspects, different sets of servers in set of resource servers 108 can be selected to deliver different resources to different users and/or for different applications. The cloud management system 104 can register the finalized group of servers in the set resource servers 108 contributing to or otherwise supporting the set of instantiated machines, services, or processes.

The cloud management system 104 can then set up and launch the initiation process to instantiate the virtual machines, processes, services, and/or other resources to be hosted and delivered from the one or more clouds 102. The cloud management system 104 can for instance transmit an instantiation command or instruction to the registered group of servers in the set of resource servers 108. The cloud management system 104 can receive a confirmation message back from each registered server in set of resource servers 108 indicating a status or state regarding the provisioning of their respective resources. Various registered resource servers may confirm, for example, the availability of a dedicated amount of processor cycles, amounts of electronic memory, communications bandwidth, services, and/or applications or other software prepared to be served and delivered.

Figure 2:
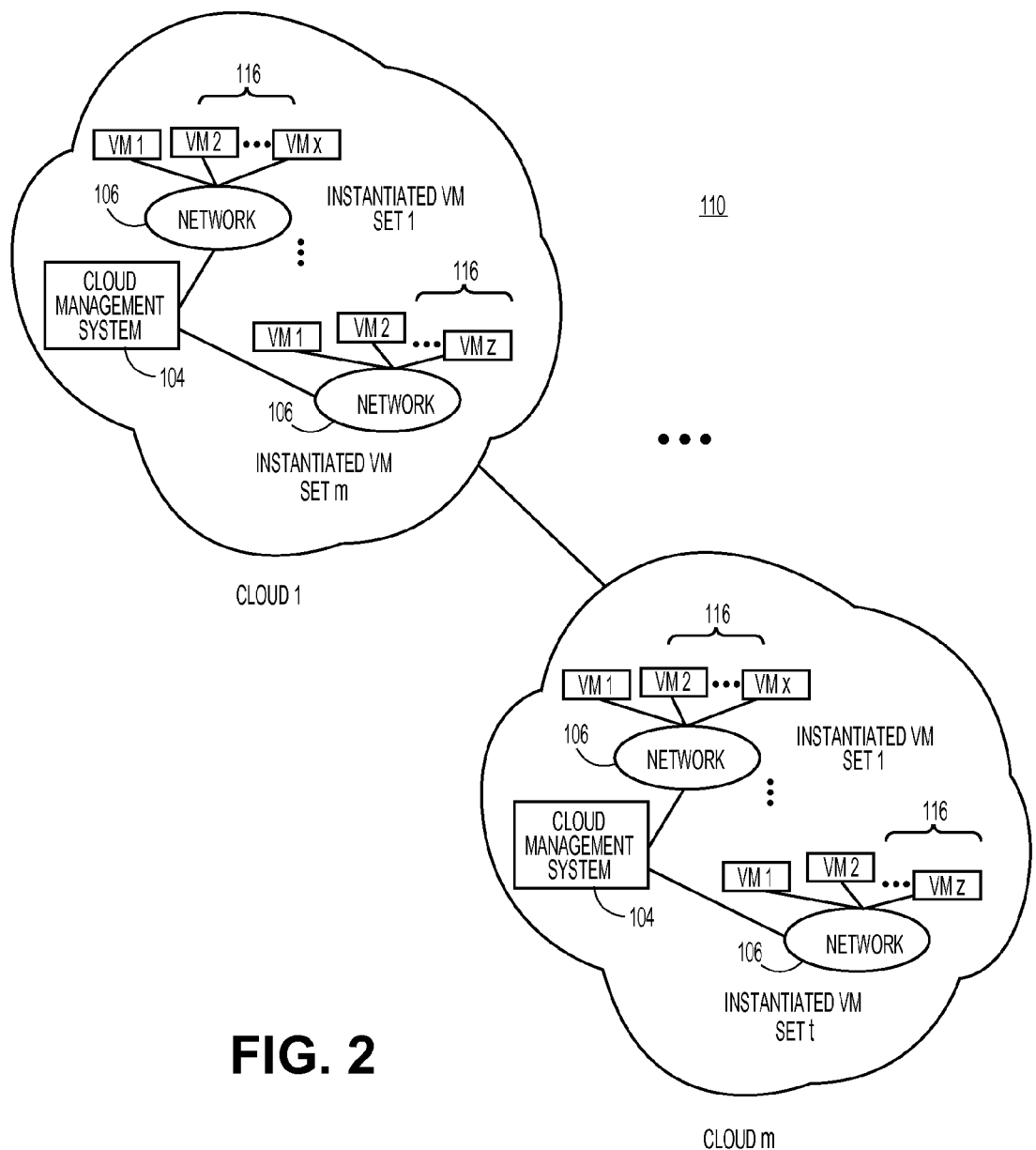
FIG. 2 illustrates an overall cloud system architecture in which various aspects of systems and methods for triggering workload movement based on a policy stack having multiple selectable inputs can be implemented, in further regards.

As shown for example in FIG. 2, after coordination of the sources and configuration of resources including the hardware layer, selected software, and/or other resources, the cloud management system 104 can then instantiate a set of virtual machines 116, and/or other appliances, services, processes, and/or entities, based on the resources supplied by servers within set of resource servers 108 registered to support the one or more clouds 102 in a multiple-cloud network 110. According to aspects, cloud management system 104 can access or interact with a virtualization module, platform, or service to instantiate and operate set of virtual machines 116, such as the kernel-based virtualization manager (KVM™) available from Red Hat, Inc. of Raleigh, N.C., or others. In embodiments, the cloud management system 104 can instantiate a given number, for example, 10, 500, 1000, 20,000, or other numbers or instances of virtual machines to populate one or more clouds 102 and be made available to users of that cloud or clouds. In aspects, users may access the one or more clouds 102 via the Internet, or other public or private networks. Each virtual machine can be assigned an instantiated machine ID that can be stored in the resource aggregation table, or other record or image of the instantiated virtual machine population. Additionally, the cloud management system 104 can store data related to the duration of the existence or operation of each operating virtual machine, as well as the collection of resources utilized by the overall set of instantiated virtual machines 116.

In embodiments, the cloud management system 104 can further store, track and manage each user's identity and associated set of rights or entitlements to software, hardware, and other resources. Each user that operates a virtual machine or service in the set of virtual machines in the cloud can have specific rights and resources assigned and made available to them, with associated access rights and security provisions. The cloud management system 104 can track and configure specific actions that each user can perform, such as the ability to provision a set of virtual machines with software applications or other resources, configure a set of virtual machines to desired specifications, submit jobs to the set of virtual machines or other host, manage other users of the set of instantiated virtual machines 116 or other resources, and/or other privileges, entitlements, or actions. The cloud management system 104 associated with the virtual machine(s) of each user can further generate records of the usage of instantiated virtual machines to permit tracking, billing, and auditing of the resources and services consumed by the user or set of users. In aspects of the present teachings, the tracking of usage activity for one or more user (including network level user and/or end-user) can be abstracted from any one cloud to which that user is registered, and made available from an external or independent usage tracking service capable of tracking software and other usage across an arbitrary collection of clouds, as described herein. In embodiments, the cloud management system 104 of an associated cloud can for example meter the usage and/or duration of the set of instantiated virtual machines 116, to generate subscription and/or billing records for a user that has launched those machines. In aspects, tracking records can in addition or instead be generated by an internal service operating within a given cloud. Other subscription, billing, entitlement and/or value arrangements are possible.

The cloud management system 104 can configure each virtual machine in set of instantiated virtual machines 116 to be made available to users via one or more networks 116, such as the Internet or other public or private networks. Those users can for instance access set of instantiated virtual machines via a browser interface, via an application server such as a Java™ server, via an application programming interface (API), and/or other interface or mechanism. Each instantiated virtual machine in set of instantiated virtual machines 116 can likewise communicate with its associated cloud management system 104 and the registered servers in set of resource servers 108 via a standard Web application programming interface (API), or via other calls, protocols, and/or interfaces. The set of instantiated virtual machines 116 can likewise communicate with each other, as well as other sites, servers, locations, and resources available via the Internet or other public or private networks, whether within a given cloud in one or more clouds 102, or between those or other clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the one or more clouds 102. In embodiments, the set of virtual machines 116 or other services, machines, or resources may not depend in any degree on or require the user's own on-premise hardware or other resources. In embodiments, a user can therefore request and instantiate a set of virtual machines or other resources on a purely off-premise basis, for instance to build and launch a virtual storefront, messaging site, and/or any other application. Likewise, one or more clouds 102 can also be formed in whole or part from resources hosted or maintained by the users of those clouds, themselves.

Because the cloud management system 104 in one regard specifies, builds, operates and manages the set of instantiated virtual machines 116 on a logical or virtual level, the user can request and receive different sets of virtual machines and other resources on a real-time or near real-time basis, without a need to specify, install, or configure any particular hardware. The user's set of instantiated virtual machines 116, processes, services, and/or other resources can in one regard therefore be scaled up or down immediately or virtually immediately on an on-demand basis, if desired. In embodiments, the set of resource servers 108 that are accessed by the cloud management system 104 to support the set of instantiated virtual machines 116 or processes can change or be substituted, over time. The type and operating characteristics of the set of instantiated virtual machines 116 can nevertheless remain constant or virtually constant, since instances are assembled from a collection of abstracted resources that can be selected and maintained from diverse sources based on uniform specifications. Conversely, the users of the set of instantiated virtual machines 116 can also change or update the resource or operational specifications of those machines at any time. The cloud management system 104 and/or other logic can then adapt the allocated resources for that population of virtual machines or other entities, on a dynamic basis.

In terms of network management of the set of instantiate virtual machines 116 that have been successfully configured and instantiated, the one or more cloud management systems 104 associated with those machines can perform various network management tasks including security, maintenance, and metering for billing or subscription purposes. The cloud management system 104 of one or more clouds 102 can, for example, install, initiate, suspend, or terminate instances of applications or appliances on individual machines. The cloud management system 104 can similarly monitor one or more operating virtual machines to detect any virus or other rogue process on individual machines, and for instance terminate an application identified as infected, or a virtual machine detected to have entered a fault state. The cloud management system 104 can likewise manage the set of instantiated virtual machines 116 or other resources on a network-wide or other collective basis, for instance, to push the delivery a software upgrade to all active virtual machines or subsets of machines. Other network management processes can be carried out by cloud management system 104 and/or other associated logic.

In embodiments, more than one set of virtual machines can be instantiated in a given cloud at the same time, at overlapping times, and/or at successive times or intervals. The cloud management system 104 can, in such implementations, build, launch and manage multiple sets of virtual machines as part of the set of instantiated virtual machines 116 based on the same or different underlying set of resource servers 108, with populations of different virtual machines such as may be requested by the same or different users. The cloud management system 104 can institute and enforce security protocols in one or more clouds 102 hosting one or more sets of virtual machines. Each of the individual sets or subsets of virtual machines in the set of instantiated virtual machines 116 can be hosted in a respective partition or sub-cloud of the resources of the main cloud 102. The cloud management system 104 of one or more clouds 102 can for example deploy services specific to isolated or defined sub-clouds, or isolate individual workloads/processes within the cloud to a specific sub-cloud or other sub-domain or partition of the one or more clouds 102 acting as host. The subdivision of one or more clouds 102 into distinct transient sub-clouds, sub-components, or other subsets which have assured security and isolation features can assist in establishing a multiple user or multi-tenant cloud arrangement. In a multiple-user scenario, each of the multiple users can use the cloud platform as a common utility while retaining the assurance that their information is secure from other users of the same one or more clouds 102. In further embodiments, sub-clouds can nevertheless be configured to share resources, if desired.

In embodiments, and as also shown in FIG. 2, the set of instantiated virtual machines 116 generated in a first cloud in one or more clouds 102 can also interact with a set of instantiated virtual machines, services, and/or processes generated in a second, third or further cloud in one or more clouds 102, comprising a multiple-cloud network 110. The cloud management system 104 of a first cloud of one or more clouds 102 can interface with the cloud management system 104 of a second, third, or further cloud of one or more clouds 102 to coordinate those domains and operate the clouds and/or virtual machines, services, and/or processes on a combined basis. The cloud management system 104 of a given cloud on one or more clouds 102 can in aspects track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, government, and/or other entity. In embodiments, the user can be or include another virtual machine, application, service and/or process. In further embodiments, multiple users or entities can share the use of a set of virtual machines or other resources.

Aspects of the present teachings relate to platforms and techniques in which a policy management tool and/or other application, service, and/or logic can build, maintain, and apply a migration policy stack comprising a set of rules, thresholds, parameters, functions, and/or other criteria or policies by which the migration of one or more workloads to a new host target cloud can be analyzed and potentially carried out. In aspects, the migration policy stack can be automatically generated and/or initiated, in whole or part, by the policy management tool itself, although in implementations, the migration policy stack can in addition or instead be generated and/or initiated through manual inputs and/or selections received from a user. In aspects, the rules and/or other criteria contained in the migration policy stack can be configured in layers and/or to form compound policies, which can depend on or be a function of other policies and/or conditions, so that the resulting migration policy stack may not be fixed or static in nature, but instead, may represent a set of decision logic that is dynamic and/or time-varying in nature. In implementations, a user can update or alter the migration policy stack at any time through a graphical or other interface, creating additional flexibility in workload operations and management.

Figure 3:
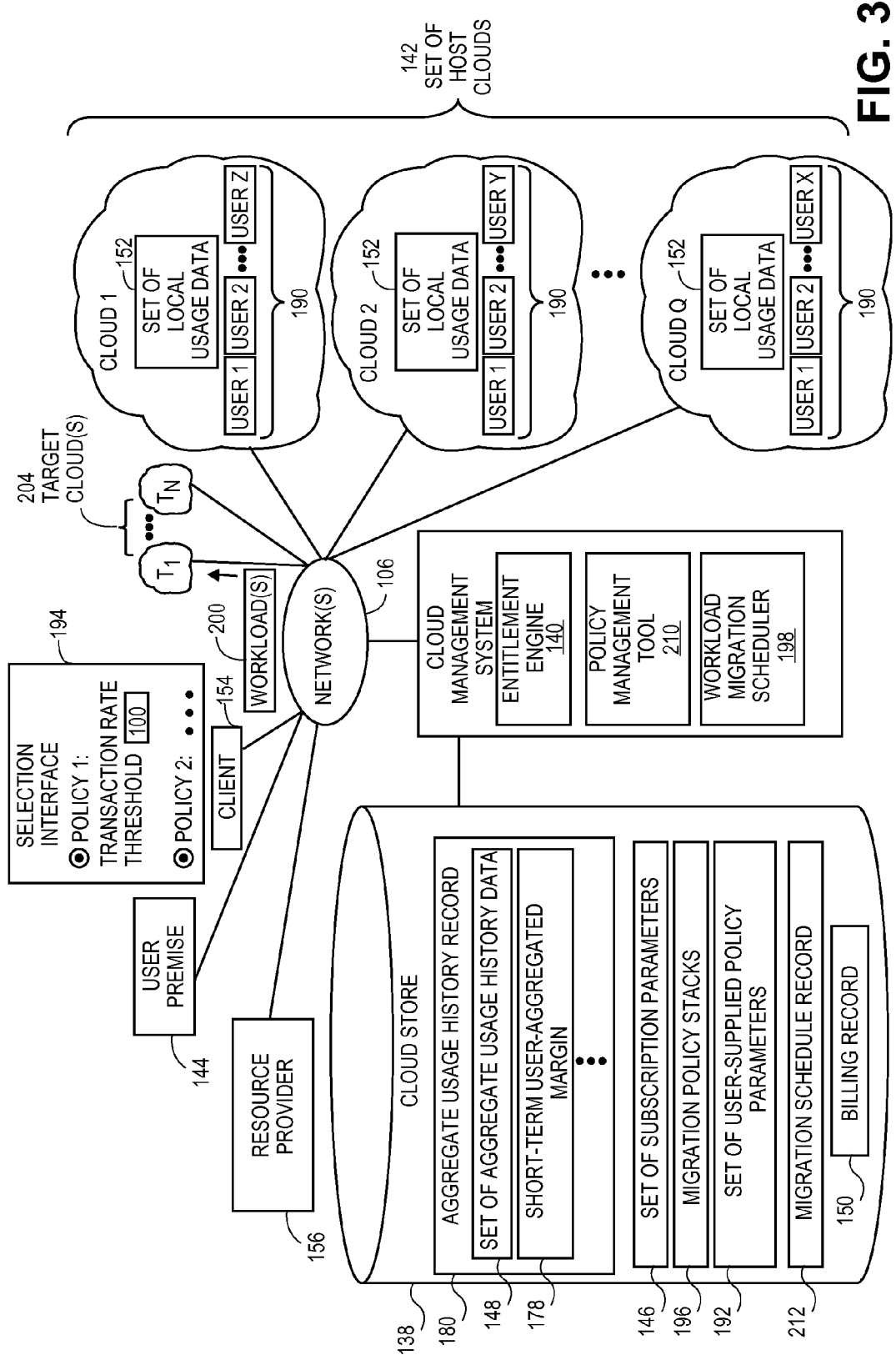
FIG. 3 illustrates a network configuration in which systems and methods for triggering workload movement based on a policy stack having multiple selectable inputs can be implemented, including the capture and reconciliation of short-term resource consumption margins across a set of multiple users, potentially across multiple host clouds as well as to store an process a migration policy stack for workload migration.

Consistent with the foregoing, in general, FIG. 3 shows an illustrative network configuration in which systems and methods for triggering workload movement based on a policy stack having multiple selectable inputs can be implemented, according to various embodiments. In embodiments as shown, one or more users can operate a user premise 144, such as a local area network with a set of servers and client machines, and/or other machines or resources. In aspects, a set of users 190 can in addition or instead operate one or more sets of virtual machines, appliances, and/or other virtual entities (not shown) in a set of host clouds 142. In aspects, the set of users 190 can be or include a collection of sub-groups of users who are each affiliated with or a part of the same entity, such as a corporation, government entity, and/or other organization. In aspects, the corporation and/or other collective entity can establish overall subscription parameters to which its users are entitled on a collective basis. In cases, the individual teams or users may not be aware or have a mechanism by which to track overall resource consumption on a collective basis, for instance to maintain service or resource level limits.

According to aspects, systems and methods according to the present teachings can permit centralized processing of workload management and migration policies, among other management functions and controls. In aspects, the set of host clouds 142 hosting the set of users 190 can include a set of diverse and/or otherwise unrelated cloud-based networks to which the set of users 190 can subscribe for various resources under various subscription terms, limits, criteria, service level agreements, and/or other conditions, which can be recorded or reflected in a set of subscription parameters 146. The set of subscription parameters 146 can for instance be stored in the cloud store 138 hosted or accessed by a cloud management system 104, and/or in other storage resources or locations.

In embodiments as shown, an administrator and/or other user can operate a client 154 or other interface or terminal, for instance a client located in or communicating with the user premise 144 to access the set of subscription parameters 146 and other information related to the consumption of resources in the set of host clouds 142 by the set of users 190. In aspects, the consumption of resources in the set of host clouds 142 and generation of related billing events and other subscription-related activities can be tracked and managed by an entitlement engine 140, which can be hosted in the cloud management system 104 and/or in other locations, resources, or services. According to aspects, the entitlement engine 140 can communicate with a one or more resource providers 156, such as the vendors of software such as operating systems, applications, utilities, and/or other programs, services, and/or related resources. The one or more resource providers 156 can maintain part or all of the terms, conditions, limits, criteria, stipulations, and/or other parameters of the subscription of the set of users 190 to one or more resources hosted or provisioned in the set of host clouds 142, and for instance reflected in the set of subscription parameters 146.

In aspects, each host cloud in the set of host clouds 142 can capture and store a set of local usage data 152. The set of local usage data 152 can record the consumption or use of resources in a local host cloud in the set of host clouds 142, such as the number of instances of software including operating systems and applications, processor resources, memory resources, communications resources, storage resources, and/or other elements or resources. The set of local usage data 152 can include usage data for one, some, and/or all of the set of users 190 operating virtual machines or otherwise consuming resources in each particular host cloud. The entitlement engine 140 can periodically receive the set of local usage data 152 and/or updates to that information from one or more host clouds in the set of host clouds 142. The receipt of the set of local usage data 152 or any portion of the set of local usage data 152 can be performed in aspects on a pull or demand basis, where the entitlement engine 140 and/or other logic can issue commands or instructions to one or more host clouds in the set of host clouds 142, and receive that data back from the interrogated cloud or clouds. In aspects, the set of local usage data 152 can be transmitted to the entitlement engine 140 on a push basis, for instance, on a scheduled, predetermined, event-triggered, and/or other basis initiated by one or more of the host clouds in set of host clouds 142, themselves. Other channels, schedules, and techniques for the collection of the set of local usage data 152 from any one or more of the set of host clouds 142 can be used.

After receipt of the set of local usage data 152, any portion or component of the set of local usage data 152, and/or updates to the same, the entitlement engine 140 can collect and aggregate the set of local usage data 152 from the various host clouds and organize that data in a set of aggregate usage history data 148. The set of aggregate usage history data 148 can reflect recent and/or accumulated usage consumption by the set of users 190 and/or any one user or other subset thereof in all of the set of host clouds 142, over comparatively short-term periods or intervals such as minutes, one or more hours, one day, a number of days, a week, a month or months, and/or other intervals or periods. In aspects, the entitlement engine 140 can collect the set of local usage data 152 regardless of whether each of those clouds is configured to communicate with each other or not. In aspects, the set of aggregate usage history data 148 can present to the entitlement engine 140 and/or other logic the combined resource consumption by the set of users 190 across the user premise 144 and/or all operating virtual machines or entities, on an hour-by-hour, day-by-day, and/or other relatively short-term basis.

According to aspects, the entitlement engine 140 can thereby identify comparatively short-term resource consumption by the virtual machines or other entities, sites or nodes operated by the set of users 190, and capture and track that consumption compared to the short-term limits, levels, thresholds, ceilings, or caps that may be contained in the set of subscription parameters 146 for that user. The entitlement engine 140 can therefore generate or determine a short-term consumption margin for each resource which the set of users 190 consume and/or subscribe to in each cloud in the set of host clouds 142, indicating whether over the course of an hour or other period the consumption rates or values are over the subscription limit for a given resource, under the subscription limit, or at or nearly at the subscription limit for that resource.

Both the over and under-consumption margins for each resource can be captured and calculated, from which the entitlement engine 140 can generate a set of short-term user-aggregated margins 178 representing the collective short-term consumption of that resource across the diverse host clouds in set of host clouds 142, resulting in an offset or aggregate consumption value. Deviations from short-term consumption caps, limits, service level agreements (SLAs), and/or other criteria can therefore be combined, averaged, aggregated, and/or otherwise "smoothed out" to more accurately and/or timely reflect the consumption patterns of the set of users 190, as a whole on an aggregate basis. In aspects, the resource provider 156, the cloud operators or providers of the set of host clouds 142, and/or other entities can thereby charge, bill, or otherwise adjust the subscription costs or other factors encoded in the billing record 150 sent to the set of users 190, for instance via an administrator or other users, so that their subscription obligations more closely track the actual consumption behavior demonstrated by the set of users 190. In aspects, the set of short-term user-aggregated margins 178 can for instance be used to establish short-term marginal subscription costs based on short-term deviations from any subscription consumption limits, which costs can then be combined over different time periods to further average or aggregate the deviations in resource consumption. In aspects, the detection of bursts and relaxations in resource consumption over relatively short-term periods can thereby allow both positive and negative offsets or margins in subscription costs, creating a more accurate assignment of subscription rates. In embodiments as shown, the over-consumption of one or more resources and/or related events can be reflected in a set of over-subscription conditions 226, which can include records indicating the degree by which various resources (processor, memory, storage, operating system, application, etc.) exceeds any subscription caps or levels in a given interval of time.

In implementations as shown, after detecting the set of short-term user-aggregated margins 178 for each resource of interest, the entitlement engine 140 can generate a billing record 150 reflecting that event, for purposes of notification to the user and collection of billing amounts or other responses. In aspects, the entitlement engine 140 can transmit or forward the billing record 150 to the resource provider 156, such as a software vendor, to produce and transmit to the user under agreed billing arrangements. In aspects, the entitlement engine 140 can transmit or forward the billing record 150 to one or more host clouds in set of host clouds 142, including those in which an over-limit resource usage or other event took place, to potentially transmit to the set of users 190 and/or other recipient for similar purposes. In aspects, the resource provider 156 and one or more cloud operators or cloud providers of the set of host clouds 142 can maintain agreements or arrangements for the capture and forwarding of the billing record 150, and the collection of any billing amounts or credits paid by the user. In aspects, the resource provider 156 and the host cloud providers or operators can establish arrangements to share or distribute any overage payments or other payments or credits received from users between themselves. According to aspects, the monitoring and billing capture of short or long-term over-limit resource consumption can therefore be conducted, on a marginal offset or other basis, even in instances where each host cloud in set of host clouds 142 is not aware of subscription limits contained in the set of subscription parameters 146, and/or the local usage data 152 of one or more of the set of host clouds 142 is not visible to other host clouds and/or all groups or sub-groups of users within the set of users 190, and/or to other participants in the cloud-based network.

In implementations, the cloud management system 102 and/or other server, logic, and/or resource of the set of host clouds 142 and/or other clouds or networks can be configured with a policy management tool 210, which can be or include application(s), software, logic, services, hardware, and/or other resources used to implement various processing and decisions for initiating, building, maintaining, and applying a migration policy stack 196 that can be used to monitor, direct, and manage the migration of one or more workloads 200 which are operating and/or executing in the set of host clouds 142 and/or other hosts. In aspects, the policy management tool 210 can access information regarding the resource consumption of the one or more workloads 200 via the set of aggregate usage history data 148 and/or other data sources or records, and determine the overall operating condition of the one or more workloads 200 including rates of resource consumption (e.g., processor, memory, storage, operating system instances, application instances) by the set of virtual machines 116 executing and/or supporting the one or more workloads 200. In cases, the user or operator of the one or more workloads 200 may wish to consider moving or migration the one or more workloads 200 to one or more target clouds 204, due to under-consumption, over-consumption, and/or other operating conditions of the one or more workloads 200. In the case of under-consumption, the user or operator may wish to migrate the one or more workloads 200 because the user is over-committed in terms of their set of subscription parameters 146 to more hardware, software, and/or other resources than the one or more workloads 200 demand or require, so that potentially reduced costs and/or other benefits can be achieved by migrating the one or more workloads 200 to the one or more target clouds 204 under more favorable subscription terms. In the case of over-consumption, the user or operator may wish to migrate the one or more workloads 200 because the user is under-subscribed in terms of their set of subscription parameters 146 for the hardware, software, and/or other resources than the one or more workloads 200 demand or require. In that case, avoidance of enhanced subscription charges and other cost reductions and/or other benefits can be achieved by migrating the one or more workloads 200 to the one or more target clouds 204 with larger capacities and/or increased or scaled resources, so that migration will also represent subscription benefits. In aspects, to assist with those and other operations, the policy management tool 210 can build and maintain the migration policy stack 196 to establish and apply migration policies that can, in general, change or vary depending on conditions in the one or more workloads 200 and/or other factors.

To perform those policy-related tasks, the policy management tool 210 and/or other logic, application, and/or service can interact with a selection interface 194, such as a graphical or other user interface on a client or other machine, to receive selections and/or inputs from the administrator and/or other user of the one or more workloads 200 to develop migration conditions and rules. In general, the user can operate the selection interface 194 and/or other interface or channel to supply or select a set of user-supplied policy parameters 192 to analyze, organize, and guide the migration of one or more workloads 200 to one or more target clouds 204. In aspects, the set of user-supplied policy parameters 192 can be or include data, variables, parameters, thresholds, functions, and/or criteria, such as rules or logic relate to consumption rates for various resources used in one or more workloads 200, time periods over which the one or more workloads 200 operates and/or resources, and/or other factors, variables, and/or criteria. In aspects, for example, the user can operate the selection interface 194 to provide a set of user-supplied policy parameters 192 that indicate that migration should be performed or considered "each night from Monday through Friday from 9:00 p.m. to 6:00 a.m. if the transaction rate for the one or more workloads 200 falls below a rate of 10 transactions/second for more than 30 minutes." The user can likewise operate the selection interface 194 to provide a set of user-supplied policy parameters 192 that indicate that migration should be performed or considered "each night Saturday and Sunday from 8:00 a.m. to 11:00 p.m. if the transaction rate for the one or more workloads 200 falls below a rate of 15 transactions/second for more than 60 minutes." In aspects, the user can operate the selection interface 194 to input or select a set of user-supplied policy parameters 192 which comprise, configure, and/or generate one or more compound migration parameters 202, which can represent a sequence or layers of parameters which are functionally inter-related to each other to create a contingent or dynamic policy. The one or more compound migration parameters 202 can be or include, for instance, an indication that migration should be evaluate when "processor usage falls below 80% of subscription limits and operating system instances fall below 70% of subscription limits from 1:00 p.m. to 5:00 p.m.," then migration should be evaluated to send one or more workloads 200 to Cloud A in the one or more target clouds 204, unless Cloud A reports greater than 90% resource usage load, in which case an evaluation should be made to send one or more workloads 200 to Cloud B in the one or more target clouds 204. Additional and/or other constraints, thresholds, logic, functions, and/or factors can be used in the migration policy stack 196, the set of user-supplied policy parameters 192, the one or more compound migration parameters 202, and/or other variables, functions, and/or criteria.

Upon determining that one or more policies reflected in the migration policy stack 196 permit or require the migration of the one or more workloads 200 to one or more clouds in the one or more target clouds 204, the policy management tool 210 and/or other logic can interact with a workload migration scheduler 198 to schedule one or more movements or migrations of the one or more workloads 200 to those host target(s). In cases, the workload migration scheduler 198 can initiate an immediate, real-time, and/or near real-time migration or deployment of the one or more workloads 200 to the selected one or more target clouds 204, and/or can schedule a migration of the one or more workloads 200 for a later time or date. In cases, the one or more workloads 200 and/or portions thereof can be migrated directly to a single host cloud in the one or more target clouds 204, or, in cases, the one or more workloads 200 and/or portions thereof can be migrated to multiple target clouds in the one or more target clouds 204, and/or can migrated to different target hosts at different times. Other migration techniques, schedules, channels, and/or conditions can be used.

Figure 4:
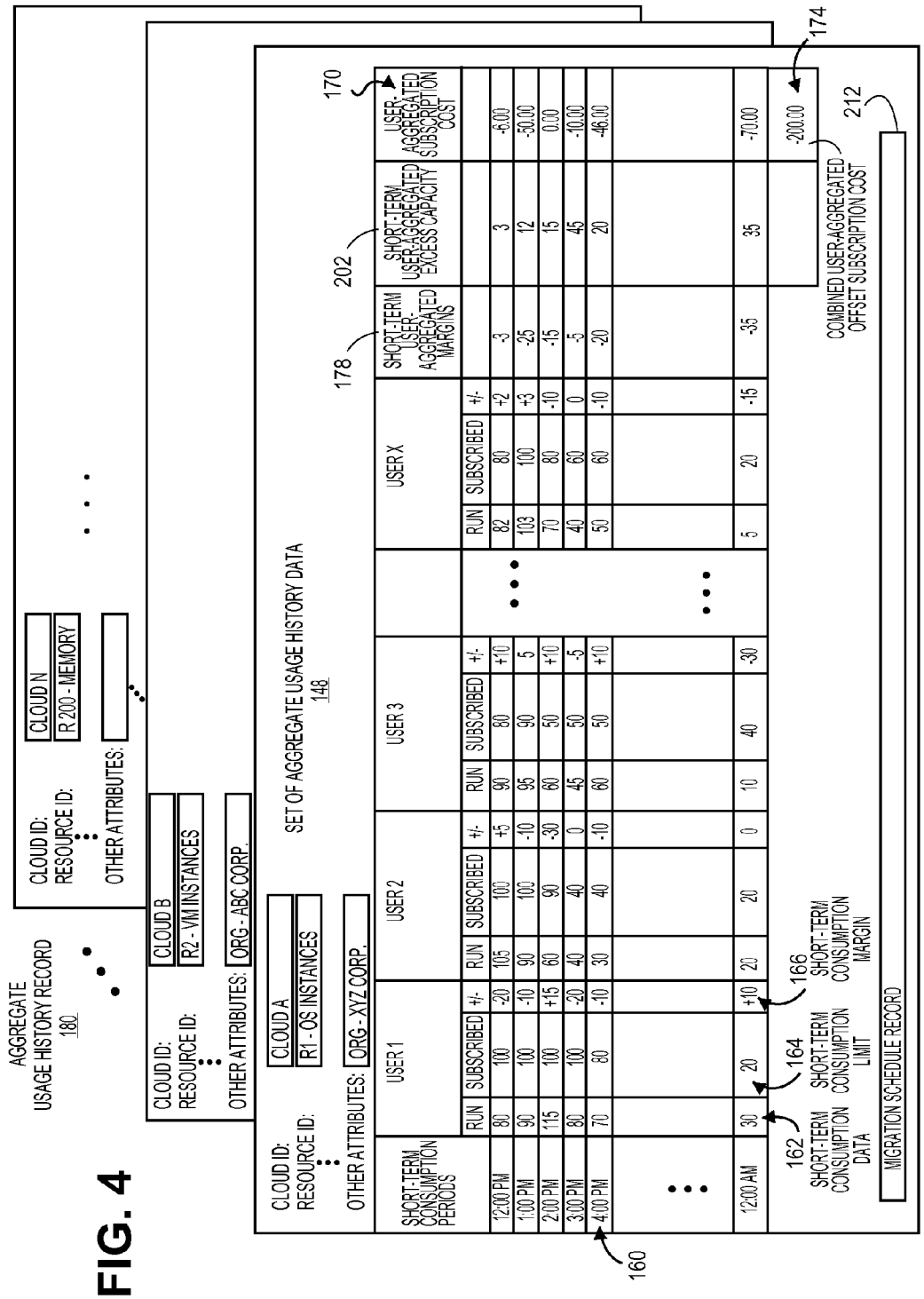
FIG. 4 illustrates an exemplary data structure in which the capture and aggregation of marginal resource consumption data for multiple users, migration schedules and other data can be encoded and stored, according to various aspects.

In terms of data capture of the usage, subscription, billing and related information used to detect and record resource consumption, excess resource capacity flows, and/or other information and/or other events, FIG. 4 illustrates an aggregate usage history record 180 that can be used to store the set of aggregate usage history data 148 which can store and encode various data, attributes, criteria, and/or other information used to track and manage the differential or marginal resource consumption in the set of host clouds 142 and/or other host sites by the set of users 190. In aspects, the aggregate usage history record 180 can be encoded as a relational or other database, table, tree, file, object, and/or other data store or data structure. In aspects as shown, the set of aggregate usage history data 148 encoded and stored in the aggregate usage history record 180 can include tables, entries, values, attributes, and/or other information including set of short-term consumption data 162 reflecting the usage of one or more resources in the set of host clouds 142 by each user in the set of users 190 over one or more short-term consumption periods 160. In aspects, the one or more short-term consumption periods 160 can be or include a variety of periods or intervals, such as one-hour intervals (as shown), but can also be or include other periods or intervals, such as 1, 5, 10, 15, and/or 30 minutes, 2 hours, 8 hours, 12 hours, one day or 24 hours, 3 days, one week, and/or other time intervals or periods. In aspects, the one or more short-term consumption periods 160 can reflect a period or interval (or periods or intervals) that is/are shorter than the period called for in the set of subscription parameters 146 as the basic or defined interval in terms of resource consumption limits or levels, service level agreements (SLAs), and/or other subscription criteria or settings. In aspects, the short-term subscription period 160 can be defined to be equal to the subscription period(s) or interval(s) defined by the set of subscription parameters 146. In aspects, the value, length, or short-term nature of the one or more short-term consumption periods 160 can be configured as dynamic, flexible, or configurable units, rather than defined as a strict number of minutes, hours, days, and/or weeks or other units. In aspects, the short-term subscription period 160 can be set or configured by a user, such as the cloud provider(s) or cloud operator(s) of the set of host clouds 142, by the one or more resource providers 156, by the set of users 190 whose set of aggregate usage history data 148 is being track and administered, and/or by other users or entities. In aspects, a record can be kept in the aggregate usage history record 180 recording, for each cloud in the set of host clouds 142 in which the set of users 190 subscribes and/or uses or consumes resources, the short-term consumption data 162 indicating an amount, rate, or other metric of resource consumption over each of the one or more short-term consumption periods 160.

In aspects as shown, the aggregate usage history record 180 can likewise include, for each cloud in the set of host clouds 142 and each resource consumed or used in that cloud, the short-term consumption limit 164 for that user based on the set of subscription parameters 146 and/or other information for each user in the set of users 190. In aspects, the entitlement engine 140 and/or other logic can generate and store a short-term subscription margin 166 reflecting the deviation in terms of under-consumption or over-consumption of each resource for which each user in the set of users 190 has a short-term subscription limit 164. The short-term subscription margin 166 can thereby reflect, on a comparatively short-term basis, such as every 15 or 30 minutes, hour, 8 hour, one-day or other period, the marginal amount by which the consumption of a subscribed resource by the set of users 190 is fluctuating and possibly deviating from the short-term consumption limit 166. In aspects, the short-term subscription margin 166 can reflect a negative value, indicating that a lesser amount of one or more resource is being consumed or has been consumed compared to limits or levels in the set of subscription parameters 146. In aspects, the short-term subscription margin 166 can reflect a positive value, indicating that a greater amount of one or more resource is being consumed or has been consumed compared to limits or levels in the set of subscription parameters 146.

In aspects, the entitlement engine 140 and/or other logic can similarly collect and sum or aggregate the short-term subscription margin 166 over each host cloud in the set of host clouds 142 in which the set of users 190 is using or consuming the subject resource to generate a set of short-term user-aggregated margins 178, representing the comparatively short-term or immediate net consumption of the resource over the set of users 190. In aspects, the set of short-term user-aggregated margins 178 can also be aggregated over two or more clouds of the set of host clouds 142. The set of short-term user-aggregated margins 178 can be calculated and stored for each hour and/or other period represented by the one or more short-term consumption periods 160, for instance over the course of one hour, day, one week, one month, and/or other period or interval. In aspects as shown, the entitlement engine 140 and/or other logic or service can further calculate and store an aggregate consumption total 172 over a defined period, such as a one-day or other period, summing or aggregating the set of short-term user-aggregated margins 178 for a resource for one user over that period. In aspects, the aggregate consumption total 172 can thereby encode the combined, net, averaged, and/or otherwise aggregated effect of the various under and over-limit consumption events by the set of users 190 in the set of host clouds 142 over 12 hours, 24 hours, and/or other predetermined interval. The entitlement engine 140 and/or other logic can, in addition, also calculate and store a set of offset subscription costs 170 reflecting the costs, surcharges, credits, and/or other adjustments for each hour and/or other period in the one or more short-term consumption periods 160 for a particular resource across the set of users 190. A resource provider, cloud operator, and/or other entity may be entitled, for instance, to an overage subscription fee or charge at a rate of $0.50 per instance for operating system (OS) instances over the short-term consumption limit 164 based on that usage, and/or other adjustments or factors. In aspects, the set of offset subscription costs 170 can be computed at a fixed rate, and/or at a dynamically adjusted rate, for instance based on time of usage, total resource consumption, and/or other parameters. The entitlement engine 140 and/or other service or logic can also generate an aggregate offset subscription cost 174 which combines or sums the set of offset subscription costs 170 for each of the one or more short-term consumption periods 160 for a predetermined period, such as one day, one week, one month, and/or other period or interval, across the set of users 190. The aggregate offset subscription cost 174, and other consumption variables and cost factors, can in aspects thereby more accurately correspond to the overall rate or absolute amount of resource consumption in the set of host clouds 142 by the set of users 190. In embodiments, the entitlement engine 140 and/or other logic can in addition combine, sum, and/or otherwise aggregate or net the aggregate offset subscription cost 174 for multiple individual resources whose consumption data in turn has been aggregated across multiple host clouds in the corresponding aggregate offset subscription cost 174, to generate a total offset subscription cost 182. In aspects, the total offset subscription cost 182 can encapsulate the net marginal resource usage by the set of users 190 against all short-term consumption limits 164 with associated costs or credits across all host clouds in the set of host clouds 142, all subscribed resources, and/or all daily or other operative time periods constructed from the one or more short-term consumption periods 160.

In aspects and as likewise shown in FIG. 4, the entitlement engine 140 and/or other logic or service can also store a migration schedule record 212 indicating which cloud or clouds in the one or more target clouds 204 the one or more workloads 200 and/or portions thereof will be migrated to, and the time periods and/or intervals for which those workload processes will be migrated to the selected target host or hosts.

Figure 5:
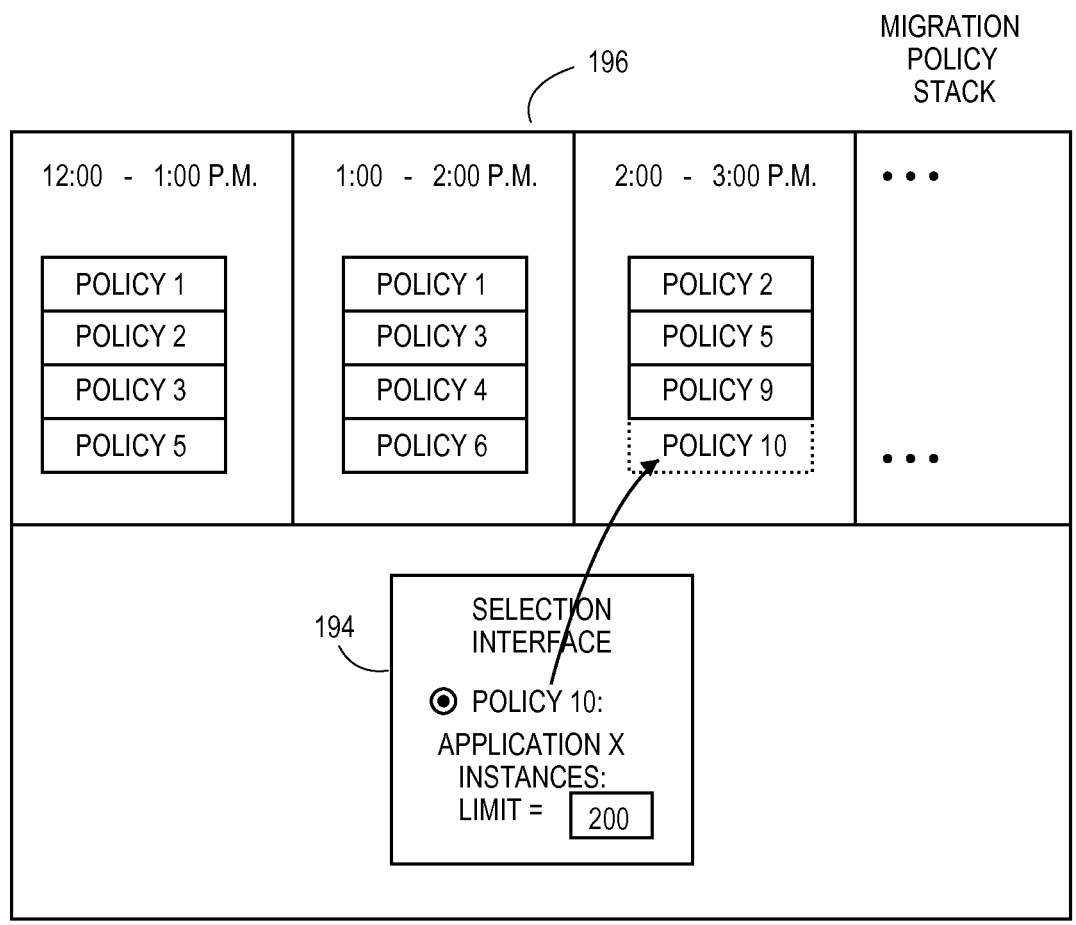
FIG. 5 illustrates a migration policy stack including selection activity to input user-selectable policies or parameters, according to aspects.

According to those and related aspects of the present teachings, and as for example further shown in FIG. 5, the migration policy stack 196 can comprise or contain a set of one or more policies (P1, P2, P3, . . . ) which are to be evaluated, applied, computed, or for which results shall otherwise be generated based on the conditions reflected in the one or more workloads 200 at one or more periods of time. In aspects, it may be noted that different policies contained in the migration policy stack 196 can be applied at or over different time periods. In aspects, the any one or more of the policies contained in the migration policy stack 196 can be made to be a function of another policy or policies, so that different combinations or layers of policies can be enforced or applied at different times or under different conditions. In aspects, the policies in the migration policy stack 196 can be assigned different priorities or weights, for instance, according to weights supplied by the user in the set of user-supplied policy parameters 192 so that, merely for instance, a minimum communications bandwidth of 2 Gigabytes/sec has a weight of 1.0 between 2:00 p.m. and 5:00 p.m. On Mondays and Tuesdays, and a weight of 0.8 at other times. Other configurations, settings, parameters, and/or logic can be stored or encode in the migration policy stack 196 and/or associated data.

Figure 6:
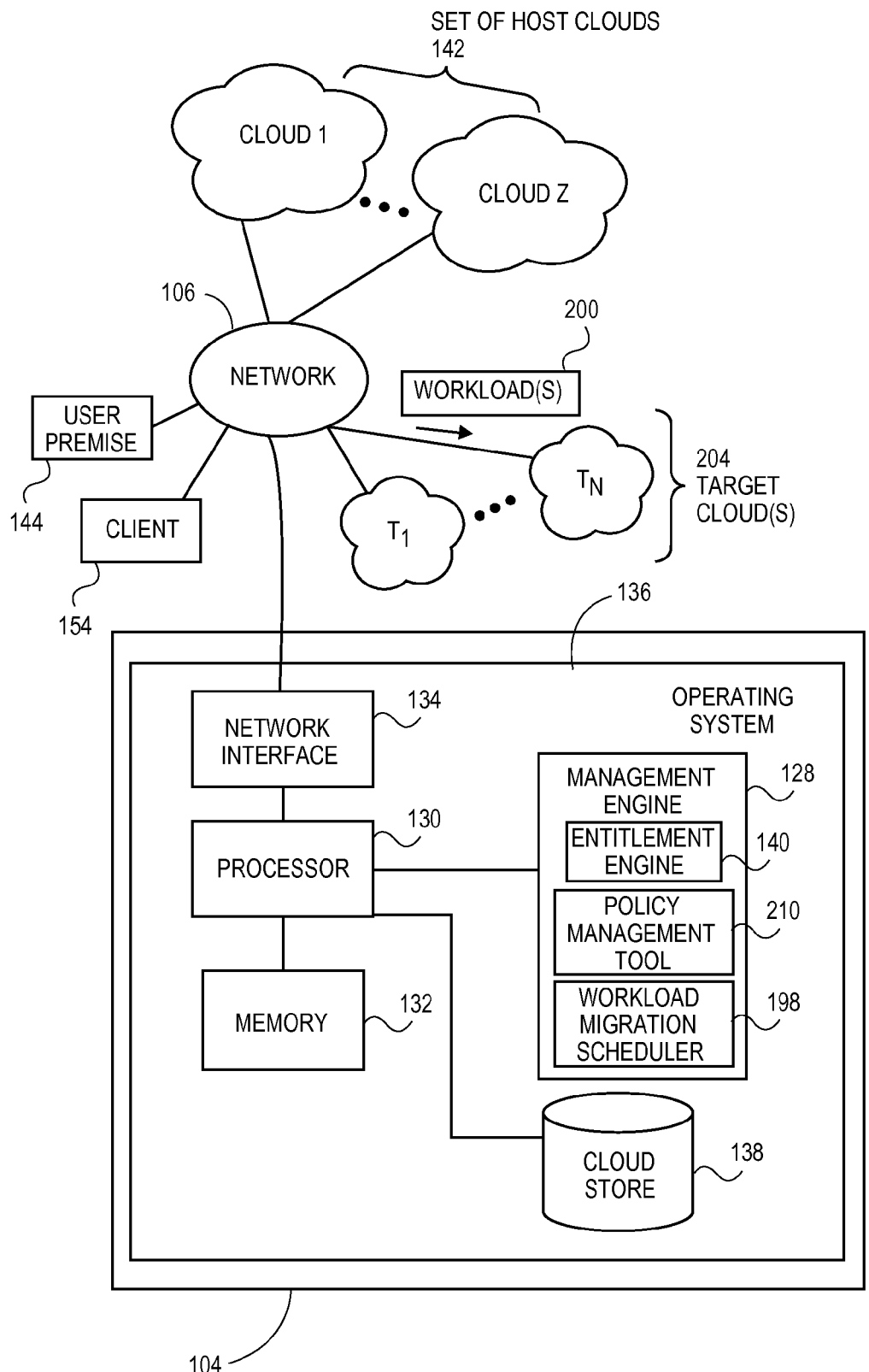
FIG. 6 illustrates an exemplary hardware configuration for a cloud management system and/or other hardware that can support and maintain one or more cloud-based networks and migration activities, according to various embodiments.

FIG. 6 illustrates an exemplary diagram of hardware and other resources that can be incorporated in a cloud management system 104 configured to communicate with the set of instantiated virtual machines 116, entitlement engine 140, user premise 144, client 154, set of host clouds 142, and/or other entities, services, or resources via one or more networks 106 and/or other connections, according to embodiments. In embodiments as shown, the cloud management system 104 can comprise a processor 130 communicating with memory 132, such as electronic random access memory, operating under control of or in conjunction with an operating system 136. The operating system 136 can be, for example, a distribution of the Linux™ operating system, the Unix™ operating system, or other open-source or proprietary operating system or platform. The processor 130 also communicates with a cloud store 138, such as a database stored on a local hard drive, and a management engine 128, to execute control logic and control the operation of virtual machines and other resources in one or more clouds 102, the set of host clouds 142, and/or other collections of clouds. The processor 130 further communicates with a network interface 134, such as an Ethernet or wireless data connection, which in turn communicates with the one or more networks 106, such as the Internet or other public or private networks. The processor 130 and/or the cloud management system 104 can likewise communicate with the entitlement engine 140, the policy management tool 210, the set of subscription parameters 146, the set of usage history data 148, the user premise 144, the client 154, the set of host clouds 142, and/or other interfaces, applications, machines, sites, services, data, and/or logic. Other configurations of the cloud management system 104, associated network connections, and other hardware, software, and service resources are possible. It may be noted that in embodiments, the client 154 and/or other hardware machines, platforms, or engines can comprise the same or similar resources as cloud management system 104, or can be configured with different hardware and software resources.

Figure 7:
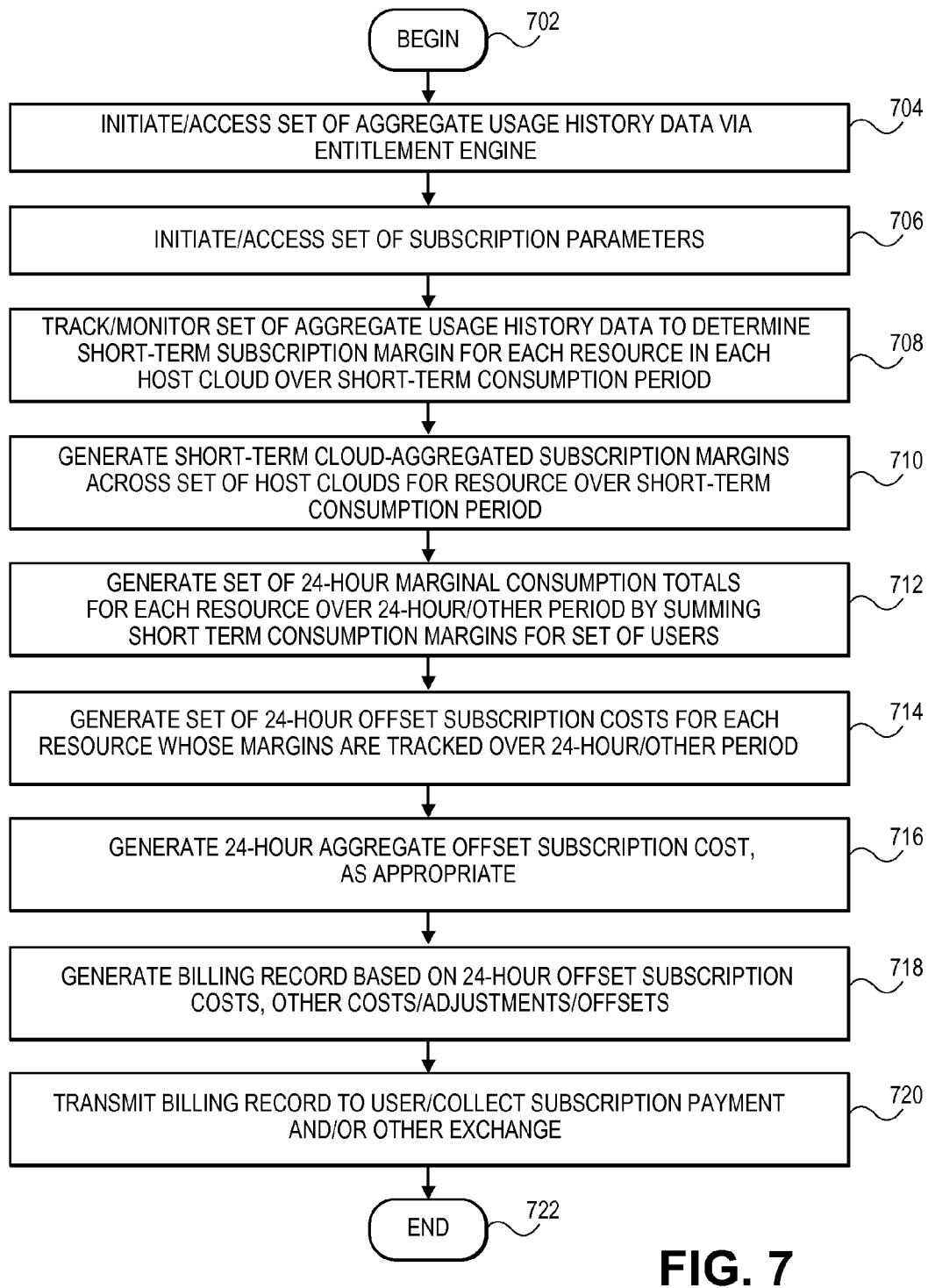
FIG. 7 illustrates a flowchart for the analysis and processing of short-term resource consumption by a set of users in different clouds, and the reconciliation of different marginal consumption values for those users including potentially across those clouds in an aggregate or offset subscription cost, that can be used in systems and methods for triggering workload movement based on a policy stack having multiple selectable inputs, according to various embodiments.

FIG. 7 illustrates a flowchart of overall processing to perform the tracking of resource consumption, management of subscription parameters, short-term billing capture and margin reconciliation and related activities, according to various embodiments of the present teachings. In 702, processing can begin. In 704, an administrator or other user can initiate and/or access the set of aggregate usage history data 148 for the set of users 190 and/or other user or users via the entitlement engine 140 and/or other logic. In 706, an administrator or other user can initiate and/or access the set of subscription parameters 146, indicating, for instance, resource consumption rates, limits, caps, and/or other subscription parameters or factors by which the set of users 190 can subscribe to resources of the set of host clouds 140. In 708, the entitlement engine 140 and/or other logic can track, register, and/or monitor the set of aggregate usage history data 148 to determine the short-term subscription margin 166 for each resource to which the set of users 190 subscribes, in each host cloud in set of host clouds 142 to which the user is registered. In aspects, the short-term subscription margin 166 can be tracked or monitored for each period in the one or more short-term consumption periods 160. In aspects, the one or more short-term subscription periods 160 can be or include one or more periods such as, for instance, one-hour periods as shown, and/or can also or instead include other periods such as periods or intervals of 1, 5, 10, 15, or 30 minutes, 8-hour periods, 12-hour periods, 24-hour periods, and/or other periods or intervals. In aspects, the one or more short-term consumption periods 160 can correspond to the short time periods tracked by the cloud management system, the entitlement engine 140, the set of host clouds 142, and/or other cloud logic or infrastructure. In aspects, the one or more short-term consumption periods 160 can comprise equally-spaced intervals, and/or can include intervals of different durations or lengths.

In 710, the entitlement engine 140 and/or other logic can sum the short-term subscription margin 166 across all users in the set of users 190 and/or all host clouds for each period of the one or more short-term consumption periods 160 to generate the short-term user-aggregated subscription margin 172 for that respective period. For instance, in exemplary records as shown in FIG. 4, the number of operating system (OS) instances instantiated and/or run by the set of users 190 in a given hour across the set of host clouds 142 can be totaled, so that instances of under-limit consumption offset instances of over-limit consumption, resulting in a net short-term cloud-aggregated subscription margin 178 for the one or more short-term consumption periods 160 across all users in set of users 190 for one or more all host clouds. In cases, the set of short-term user-aggregated margins 178 may reflect a net over-consumption (positive) value for that hour or other period (as illustratively shown), or can reflect an under-consumption (negative) value for that same period. A zero margin (at-limit) value can also be reflected.

In 712, the entitlement engine 140 and/or other logic can generate the set of marginal consumption totals 168 reflecting the total combined short-term subscription margin 166 for each resource being tracked over a 24-hour, or other interval or period. For example, and as shown for instance in FIG. 4, the under-limit (e.g. recorded as a negative value) and over-limit (e.g. recorded as a positive value) margins or increments of consumption under or over the short-term consumption limit 164 for each one or more short-term consumption periods 160 can be summed or combined to determine the set of short-term user-aggregated margins 178 for each respective resource over a 24-hour period, again for one or more host clouds. In aspects, other periods or intervals other than a 24-hour period can be used to sum the values reflected in the set of short-term user-aggregated margins 178. The values reflected in the set of short-term user-aggregated margins 178 can thereby reflect the netting out of the under-consumption and over-consumption values for a given resource in two or more dimensions, namely over multiple users and/or two or more host clouds, and over multiple instances of the one or more short-term consumption periods 160, averaging out consumption fluctuations by the set of users 190 in relation to the set of short-term consumption limits 164.

In 714, the entitlement engine 140 and/or other logic can generate the set of offset subscription costs 170 for each of the one or more short-term consumption periods 160 corresponding to the set of short-term user-aggregated margins 178 for each subscribed resource. For instance, if the record for a given one or more short-term consumption periods 160 reflects the over-consumption of 20 operating system instances, the assigned overage cost of that usage may be, for instance, $0.50 times 20 instances, or $10.00 for that hour or other period. In 716, the entitlement engine 140 and/or other logic can generate the aggregate offset subscription cost 174 for one 24-hour or other period, representing the combination of the set of offset subscription costs 170 over a multiple number of the one or more short-term consumption periods 160, such as the combination of 24 one-hour periods, or other intervals, periods, or multiples. In 718, the entitlement engine 140 and/or other logic can generate the billing record 150 based on the aggregate offset subscription cost 174 for each resource being tracked and/or metered for the set of users 190, and/or based on other costs, adjustments, offsets, and/or factors. In 720, the entitlement engine 140 and/or other logic, entities, or resources, such as the operator of the set of host clouds 142, can transmit the billing record 150 to an administrator for the set of users 190 and/or other user or other recipient. In 724, as understood by persons skilled in the art, processing can repeat, return to a prior processing point, jump to a further processing point, or end.

Figure 8:
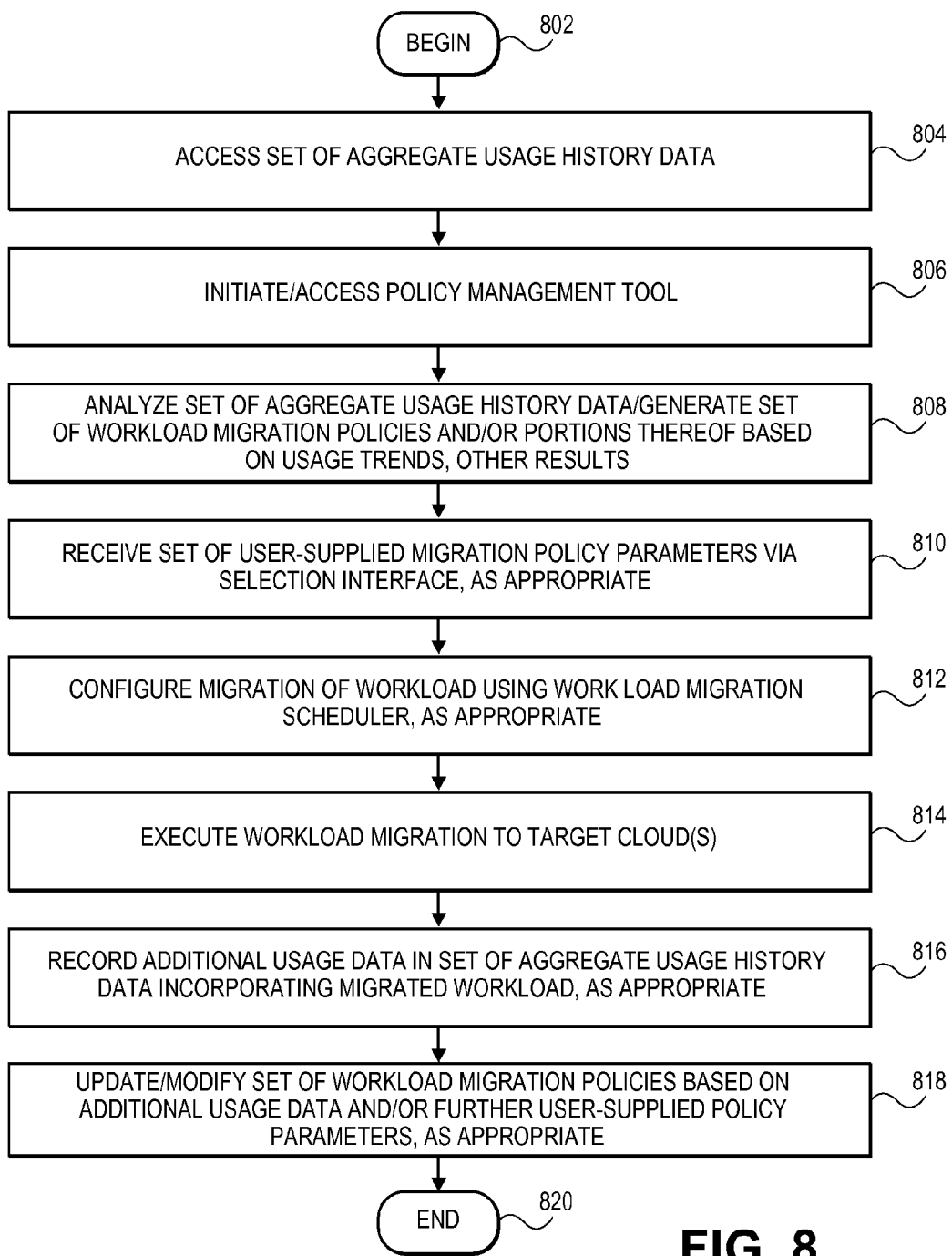
FIG. 8 illustrates a flowchart for migration policy generation and administration that can be used in systems and methods for triggering workload movement based on a policy stack having multiple selectable inputs, according to various embodiments

FIG. 8 illustrates various processing that can be used in systems and methods for a cloud deployment engine and associated policy processing that can be used in systems and methods for triggering workload movement based on a policy stack having multiple selectable inputs, according to aspects of the teachings. In 802, processing can begin. In 804, an administrator and/or other user can initiate the policy management tool 210 and/or other logic, applications, services, or tools to manage the migration policies and parameters that will be used to evaluate the potential migration of one or more workloads 200 executed in or supported by a set of virtual machines 116 operated by a user or users in the set of host clouds 142. In 806, the policy management tool 210 and/or other application, logic, and/or service can access and/or read or extract the the set of aggregate usage history data 148 for the subject user or users, as well as the set of subscription parameters 146 for the user(s) of the set of virtual machines 116, which again can for instance be or include individual users and/or collections of users, such as a corporation and/or other entity.

In 808, the policy management tool 210 and/or other application, logic, and/or service can analyze the set of aggregate usage history data 148 and/or other information to generate a set of workload migration policies 196 and/or portions thereof based on usage trends and/or other results or factors. In aspects, the set of workload migration policies 196 and/or portions thereof can be performed at an initial stage of workload policy management to generate initial or default policies, before a user has indicated their inputs or preferences for one or more policy limits or parameters. Thus for instance, the policy management tool 210 and/or other application, logic, and/or service can determine, for instance, that the user's one or more workloads 200 has, over the last seven days and/or other time period, demonstrated or reflected a reduction of 50% in data access activity from the applicable limit from the hours of 12 midnight to 7:00 a.m. from Monday through Friday, and a reduction in processor resource consumption of 75% from the applicable limit in that same period. In aspects, the policy management tool 210 can therefore establish a workload migration policy of "migrate workload (200) to a reduced-cost host cloud for the interval of 12:00 a.m. to 7:00 a.m. during the days of Monday-Friday, unless either processor consumption exceeds 25% of the limit or data access activity exceeds 50% of the limit specified in the user's set of subscription parameters (146)." Other parameters, time periods, thresholds, and/or calculations or criteria can be used.

In 810, the policy management tool 210 and/or other application, logic, and/or service can receive a set of user-selected migration policy parameters 192 via the selection interface 194 and/or other interface, channel, and/or connection. For instance, the user can supply parameters indicating "trigger workload migration to higher-capacity cloud host if transaction throughput of virtual machines 1-200 exceeds 105% of subscription limit between 10:00 a.m. and 5:00 p.m.," and/or "trigger workload migration to lower-capacity cloud host if transaction throughput of virtual machines 201-500 drops below 50% of subscription limit between 9:00 p.m. and 6:00 a.m." Other specifications, thresholds, resource consumption limits, workload performance or operating parameters, and/or other factors can be used.

In 812, the workload migration scheduler 198, the policy management tool 210 and/or other application, logic, and/or service can analyze and configure the migration of the one or more workloads 200 based on the set of workload migration policies 196, the conditions and/or values detected in the set of aggregate usage history data 148, and/or other information. In aspects, the workload migration scheduler 198, the policy management tool 210 and/or other application, logic, and/or service can schedule or initiate the migration or partial migration of one or more workloads 200 on an immediate, real-time, and/or near real-time basis, depending on the conditions and/or values reflected in the set of aggregate usage history data. In aspects, the workload migration scheduler 198, the policy management tool 210 and/or other application, logic, and/or service can in addition or instead schedule the migration or partial migration of the one or more workloads 200 on a delayed basis, for instance for a number of hours later in the evening of a given day, and/or at other times or intervals. In aspects, it may be noted that the migration of the one or more workloads 200 and/or portions thereof can be scheduled or configured on a temporary or time-limited basis, or can in cases be scheduled or configured on a permanent or comparatively long-term basis.

In 814, the workload migration scheduler 198, the policy management tool 210 and/or other application, logic, and/or service can execute the migration of the one or more workloads 200 and/or portions thereof to one or more target clouds 204, for instance, by interacting with one or more cloud management systems 102 of the one or more target clouds 204 and/or other entities, services, or resources. In 816, the entitlement engine 140, workload migration scheduler 198, the policy management tool 210, cloud management system(s) 102 of the one or more target clouds, and/or other application, logic, and/or service can record additional usage data in the set of aggregate usage history data 148 incorporating resource consumption by the migrated one or more workloads 200 operating in the one or more target clouds 204, as appropriate.

In 818, the workload migration scheduler 198, the policy management tool 210 and/or other application, logic, and/or service can update and/pr modify the set of workload migration policies 196 based on additional usage data and/or further user-selected policy parameters received in the set of user-selected policy parameters 192, as appropriate. For instance, a determination can be made that excess consumption trends or levels that triggered the migration of one or more workloads 200 and/or portions thereof to the one or more target clouds 204 have tapered off, and one or more workloads 200 need not remain in the one or more target clouds 204 for the scheduled period of time. In 820, processing can jump to a prior processing point, proceed to a further processing point, repeat, or end.

The foregoing description is illustrative, and variations in configuration and implementation may occur to persons skilled in the art. For example, while embodiments have been described in which the cloud management system 104 for a particular cloud resides in a single server or platform, in embodiments the cloud management system 104 and associated logic can be distributed among multiple servers, services, or systems. Similarly, while embodiments have been described in which one group of servers within a set of resource servers 108 can provide one component to build a requested set of virtual machines, in embodiments, one group of resource servers can deliver multiple components to populate the requested set of instantiated virtual machines 116, and/or other machines, entities, services, or resources. For further example, while embodiments have been described in which a user connects to or accesses the entitlement engine 140 via one client 154, in embodiments, multiple clients, portals, services, and/or other access points to the entitlement engine 140 can be used. Likewise, while embodiments have been described in which one entitlement engine 140 and/or policy management tool 210 operate to manage the resource consumption, billing, and/or other activities of one or more users in a set of host clouds 142, in embodiments, multiple deployment engines, scheduling engines, and/or other logic or services can perform the same or similar logic to manage deployment options. Other resources described as singular or integrated can in embodiments be plural or distributed, and resources described as multiple or distributed can in embodiments be combined. The scope of the invention is accordingly intended to be limited only by the following claims.

What is claimed is:

1. A method of managing workload migration policies, comprising:
   accessing a set of usage history data for a set of resources consumed by a workload;
   generating, by a processing device, a migration policy stack in view of a set of user-selected policy parameters, wherein the set of user-selected policy parameters comprises a set of multiple selectable inputs, and the migration policy stack comprises a set of one or more workload migration policies;
evaluating the set of one or more workload migration policies in view of the set of usage history data to configure a migration of the workload; and
scheduling the migration of the workload in view of the evaluating.

2. The method of claim 1, wherein the workload comprises a container.

3. The method of claim 1, wherein the workload comprises a micro-service.

4. The method of claim 1, wherein the set of resource consumption thresholds comprises at least one resource consumption threshold that is a function of a workload performance parameter.

5. The method of claim 4, wherein the workload performance parameter comprises a transaction rate by at least one of the set of virtual machines configured as a transaction server.

6. The method of claim 1, wherein at least one of the set of user-selected policy parameters is a function of at least one other of the set of user-selected policy parameters.

7. The method of claim 1, wherein evaluating the set of one or more workload migration policies comprises checking compliance with entitlements.

8. The method of claim 1, wherein the set of user-selected policy parameters comprises at least one policy parameter automatically generated in view of the set of usage history data.

9. A system for distributing cloud workloads, comprising:
an interface to a data store to store a set of usage history data for a set of resources consumed by a workload; and
a processing device, to communicate with the data store via the interface, the processing device to:
access the set of usage history data for the set of resources consumed by the workload;
generate a migration policy stack in view of a set of user-selected policy parameters, wherein the set of user-selected policy parameters comprises a set of multiple selectable inputs, and the migration policy stack comprises a set of one or more migration policies;
evaluate the set of one or more workload migration policies in view of the set of usage history data to configure a migration of the workload; and
schedule the migration of the workload in view of the evaluating.

10. The system of claim 9, wherein the workload comprises a container.

11. The system of claim 9, wherein the workload comprises a micro-service.

12. The system of claim 9, wherein the set of resource consumption thresholds comprises at least one resource consumption threshold that is a function of a workload performance parameter.

13. The system of claim 12, wherein the workload performance parameter comprises a transaction rate by at least one of the set of virtual machines configured as a transaction server.

14. The system of claim 9, wherein at least one of the set of user-selected policy parameters is a function of at least one other of the set of user-selected policy parameters.

15. The system of claim 9, wherein to evaluate the set of one or more workload migration policies, the processing device to check compliance with entitlements.

16. The system of claim 9, wherein the set of user-selected policy parameters comprises at least one policy parameter automatically generated based on the set of usage history data.

17. A non-transitory computer readable storage medium storing instructions which, when executed, cause a processing device to:
access a set of usage history data for a set of resources consumed by the workload;
generate, by the processing device, a migration policy stack in view of a set of user-selected policy parameters, wherein the set of user-selected policy parameters comprises a set of multiple selectable inputs, and the migration policy stack comprises a set of one or more migration policies;
evaluate the set of one or more workload migration policies in view of the set of usage history data to configure a migration of the workload; and
schedule the migration of the workload in view of the evaluating.

18. The non-transitory computer readable storage medium of claim 17, wherein the workload comprises a container.

19. The non-transitory computer readable storage medium of claim 17, wherein the workload comprises a micro-service.

20. The non-transitory computer readable storage medium of claim 17, wherein to evaluate the set of one or more workload migration policies, the instructions cause the processing device to check compliance with entitlements.

* * * * *